UNITED STATES PATENT OFFICE.

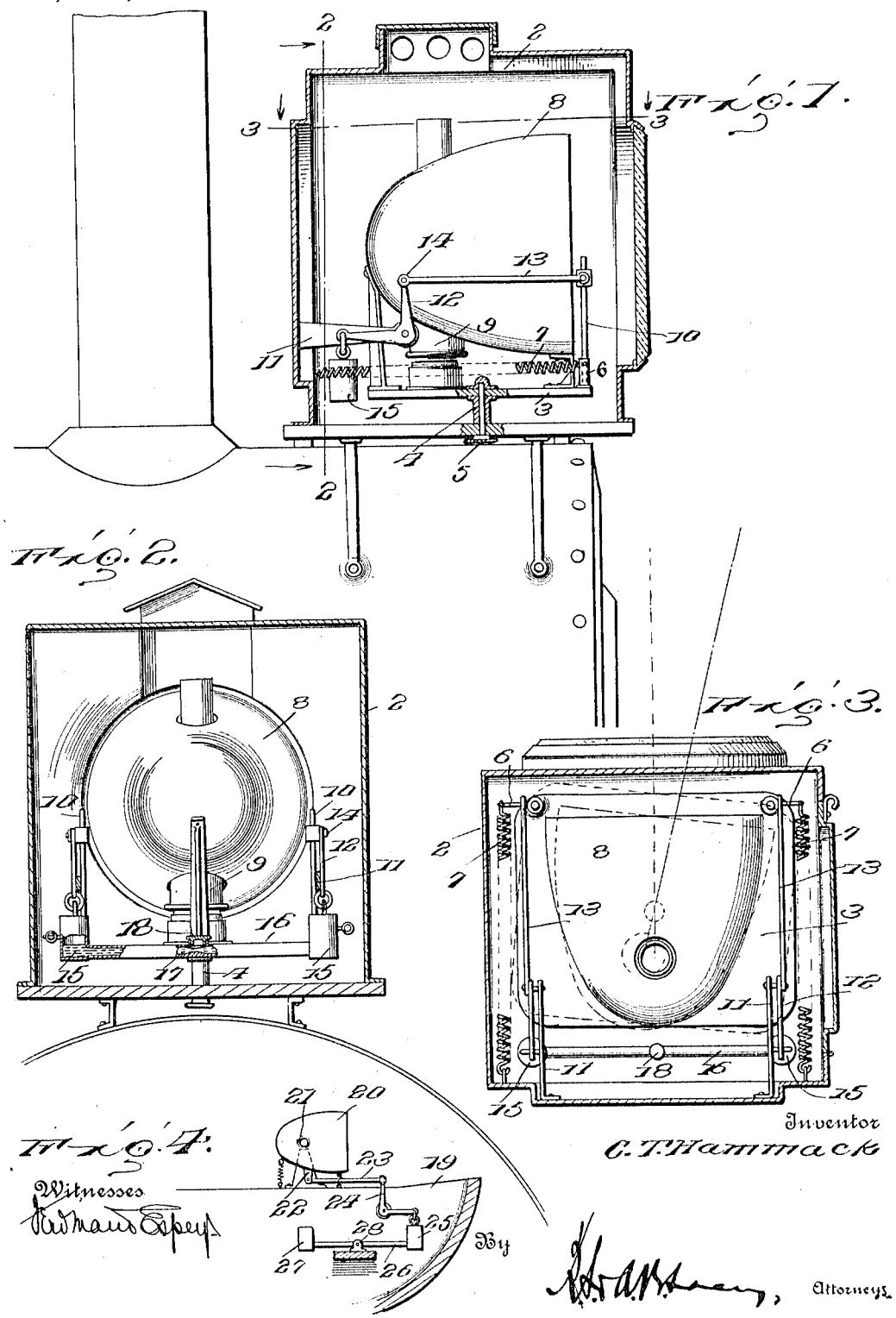

CICERO T. HAMMACK, OF KNOXVILLE, TENNESSEE.

AUTOMATIC HEADLIGHT.

1,072,114.  Specification of Letters Patent.  Patented Sept. 2, 1913.

Application filed March 22, 1912. Serial No. 685,512.

*To all whom it may concern:*

Be it known that I, CICERO T. HAMMACK, citizen of the United States, residing at Knoxville, in the county of Knox and State of Tennessee, have invented certain new and useful Improvements in Automatic Headlights, of which the following is a specification.

My invention relates to illuminating devices, and particularly to locomotive headlights.

The primary object of the invention is the provision of means whereby the headlight of a locomotive or like vehicle may be automatically turned as the locomotive strikes a curve in the track so that the light may be cast along the track instead of being directed at a tangent to the curve, as is the case where the headlight is relatively fixed and does not turn in correspondence with the turning movement of the forward trucks.

A further object is to provide means whereby the headlight may be normally held in a median position but whereby it may be automatically turned as the locomotive rounds a curve, and in this connection to provide means whereby the headlight shall be prevented from slight oscillations due to irregularities in the track, but shall only move when the track inclines as it does upon a curve.

Other objects will appear in the course of the following description.

My invention is illustrated in the accompanying drawings wherein:

Figure 1 is an elevation of a portion of a locomotive, the housing for the headlight being in section. Fig. 2 is a rear view of the locomotive headlight actuating mechanism, the housing being in section. Fig. 3 is a sectional view on the line 3—3 of Fig. 1. Fig. 4 is a side elevation of a modified form of my device.

Corresponding and like parts are referred to in the following description and indicated in all the views of the accompanying drawings by the same reference characters.

Referring to these drawings, it will be seen that 2 designates the housing of a locomotive headlight, this housing being of any ordinary form and being rigidly mounted upon the forward end of the locomotive in the usual manner. The front of the housing is, of course, provided with the usual lens or pane of glass, while the sides of the housing are formed with doors whereby the mechanism of the headlight may be easily attended to.

Disposed within the housing 2 is a rotatable table designated 3. This table may be supported in any suitable manner upon the bottom of the housing, and as illustrated is formed with a depending sleeve 4 having a firm bearing upon an upwardly projecting spindle 5. I do not wish to limit myself to any particular means for rotatably supporting the turn table as various devices might be used for the purpose.

Projecting outward adjacent to the forward edge of the turn table and on each side thereof are the members 6, and extending rearward from these members and attached to the rear wall of the housing are the coiled tension springs 7. These springs are relatively light and act to hold the turn table in a medial position while permitting the turn table to rotate when sufficient force is applied thereto.

Mounted upon the turn table in any suitable manner is a parabolic reflector designated 8 which is shown as being supported upon the turn table by brackets. A lamp 9, which is illustrated as an ordinary type of lamp, is mounted upon the turn table by means of brackets. There is no necessity of describing this lamp with particularity inasmuch as it is of ordinary and well known construction, and its details form no part of my present invention.

Projecting upward from the turn table on each side of the reflector 8 are posts or standards 10. These are located adjacent to the forward edge of the table 3. Mounted upon and projecting from the rear wall of the housing are the brackets 11, and pivotally mounted in these brackets are the bell crank levers 12 corresponding to the posts 10. Each of these bell crank levers has an upwardly projecting arm and a rearwardly projecting arm. The upwardly projecting arm is connected to the post 10 by a link 13, the link being pivotally connected at its forward end to the post and pivotally connected at 14 to the bell crank. Flexibly connected to the rear end of each of the bell cranks is a counterweight designated 15. This counterweight is hollow. It is to be particularly noted that there is a flexible connection between the counterweight and the rearwardly projecting arm of the bell crank lever so that the counterweight may swing laterally. Each counterweight is hollow and is designed to be filled with liquid or other shiftable material, and both counterweights are connected to each other by means of a connecting tube or pipe designated 16. This pipe extends from the lower ends of each of the counterweights and the pipe has a relatively contracted bore, or else is contracted at one point as at 17, for a purpose to be later stated.

The operation of my invention is as follows: Upon an ordinary straight track where the roadbed is level, the turn table 3 will be held in its normal position by means of the springs 7 which are just of sufficient tension to tend to prevent any oscillating movement of the turn table and reflector. When, however, the locomotive strikes a curve, in which case the track will be banked or inclined toward the center upon which the curve is struck, the liquid within one of the counterweights 15 will flow over to the lowest counterweight, thus causing the weight to be shifted to the lowest side of the track, and this will cause a depression of the bell crank on that side, thus causing a retraction of the connecting rod 13 and turning the turn table and reflector in the direction of the curved track. It will be seen that the amount of movement communicated to the turn table and reflector will be proportionate to the pitch of the roadbed and the sharpness of the curve. As soon as the locomotive has passed from the curve onto the level track again, the parts will automatically return to their previous condition, and the liquid within the pipe 16 and the counterweights 15 will rise to the same height in both of these counterweights. If the counterweight was rigidly connected to the rearwardly projecting arm of the bell crank lever, a depression of one counterweight would also cause a depression of the other counterweight, but this is not the case. The flexible connection between the counterweights and the arms of the bell crank levers permits the depression of one lever without the depression of the other lever.

If the passage of liquid through the pipe 16 were unobstructed, there would be a continual translation of the liquid along the pipe 16 and a continual oscillation of the headlight. This would not be desirable and hence it is that I contract the middle portion of the pipe 16 so as to tend to retard the movement of the liquid. The liquid preferably used by me is mercury as being relatively heavy and as being less subject to sudden change than water or any other lighter liquid. The liquid may be inserted in the counterweights and pipe 16 in any suitable manner, but preferably the middle of the pipe 16 is formed with an inlet opening closed by a cap 18.

I do not wish to be limited to the use of mercury or a like liquid weight within the tube and the receptacles which form the counterweights 15. It is to be particularly noted that the weight within the tube whether this be in the form of mercury, shot, liquid or any other shiftable body, constitutes a counterweight proper which is operatively connected to the turntable to cause a rotation of the same as the actuating mechanism is tilted.

While my mechanism is particularly adapted for rotating locomotive headlights in a horizontal plane to secure the automatic turning of the headlight when the engine travels around curves, I do not wish to be limited to this application of my invention as it might be used also for the purpose of holding a headlight, such as the searchlight of a boat for instance, in a horizontal plane, though the boat itself is pitching and tossing. The application of my mechanism to this purpose is illustrated in Fig. 4 wherein 19 designates a portion of a boat of any desired character, and 20 a searchlight or headlight mounted thereon and pivotally supported in any suitable manner upon a pivot 21 so that it may oscillate in a vertical plane. Depending from the reflector 20 which forms the headlight is an arm 22 connected by means of a rod 23 to a bell crank lever 24. To this lever is connected the counterweight 25 which is preferably hollow and is connected by means of a tube 26 to a second counterweight 27. The tube 26 is pivoted at its middle as at 28. The operation of this form of my invention will be obvious. When the boat or other structure pitches downward, mercury, shot or other material carried within the counterweights 25 and 27 and the tube 26 will shift downward to the counterweight 25, and this will cause the counterweights to lower, drawing downwardly upon the forwardly projecting arm of the bell crank 24 and drawing upon the connection 23, rotating the reflector upon its pivot and causing the mouth of the reflector to be turned upward to a degree depending upon the amount of downward movement on the bow of the boat. When the bow of the boat rises and the stern lowers, the material contained within the counterweights 25 and 27 and the tube 26 will shift downward toward the counterweight 27, and, as a consequence, the bell crank lever will be actuated to shift the connection 23 rearwardly, thus turning the reflector downward upon its pivot.

While I have illustrated a specific means whereby the counterweights may be connected to the reflectors shown, I do not wish to be limited to this as it is obvious that many arrangements might be provided for this purpose. Neither do I wish to be limited to the use of mercury as the shiftable ballast or weight within the counterweights and connecting tube, as other material might be used, such as very small shot, sand and the like. My invention is simple, may be applied to locomotive headlights in use today, and is positive in its operation.

It will be noted that the receptacles 15 which I have denominated counterweights are practically continuations of the tube 16 and are enlarged simply for the purpose of accommodating a relatively large amount of mercury or other shiftable ballast or weight, and that the size of these receptacles forming the counterweights 15 will depend entirely upon the adjustment of the mechanism and size of the parts to be shifted by the movement of the weight such as mercury disposed within the tube and the connected receptacles or counterweights.

What I claim is:

1. In a head light, a lamp supported in a horizontal plane, a hollow member, freely movable weight material contained within the hollow member, means independent of the lamp for shiftably supporting the hollow member, and connections from said hollow member to the lamp whereby the latter may be rotated in one or the other direction by a depression of one or the other end of the hollow member.

2. In a head light, a pivotally mounted lamp and reflector, a transversely extending member, a weight shiftably carried thereby, pivotally supporting members connected to the opposite ends of the first named member to permit the opposite ends of the first named member to be independently depressed and raised, and means operatively connecting the opposite ends of the said transverse member to opposite sides of the lamp whereby the latter may be rotated in one or the other direction by a depression of one or the other end of the transverse member.

3. In a headlight, a lamp housing, a turntable mounted within the housing, a lamp and reflector mounted on the turntable, oppositely disposed receptacles forming counterweights, a tube connecting said receptacles, said receptacles and tube containing freely shiftable material, springs normally holding the turn table in a median position, and means operatively connecting the receptacles to the turntable whereby the latter may be rotated upon a shifting of the former.

4. In a head light, a housing, a turn table mounted within the housing, a lamp and reflector mounted on the turn table, springs connected to the turn table to hold it in a median position, brackets extending from the rear end of the housing, bell crank levers pivoted upon said brackets and each having rearwardly projecting arms and upwardly projecting arms, the upwardly projecting arms of the bell crank levers being operatively connected each to the turn table, a weight supporting member connected to the rearwardly extending ends of the bell crank levers, and a shiftable weight carried thereby and movable along the length of the transversely extending member.

5. In a headlight, a lamp housing, a turntable mounted therein, a lamp and reflector mounted on the turntable, oppositely disposed parallel springs attached at one end to the housing and at the other to the forward end of the turntable whereby to hold the turntable in a median position, brackets projecting from the rear end of the housing, bell crank levers pivoted on said brackets and each having a rearwardly projecting arm and an upwardly projecting arm, upwardly extending posts on the forward end of the turntable, a connection between the upwardly projecting arm of each bell crank and the corresponding post, receptacles forming counterweights linked loosely to the rearwardly projecting arms of the bell crank levers, and a tube connecting said receptacles, said tube and the receptacles having therein freely shiftable liquid.

In testimony whereof I affix my signature in presence of two witnesses.

CICERO T. HAMMACK. [L. S.]

Witnesses:
 FREDERIC B. WRIGHT,
 J. D. YOAKLEY.